United States Patent
McClelland et al.

(10) Patent No.: US 10,065,558 B2
(45) Date of Patent: Sep. 4, 2018

(54) ILLUMINATION DEVICE FOR PROJECTING LIGHT IN A PREDETERMINED ILLUMINATION PATTERN ON A SURFACE

(71) Applicant: AGM Automotive, LLC, Wilmington, DE (US)

(72) Inventors: William Henry McClelland, Waterford, MI (US); Steven Scott Fileccia, Waterford, MI (US)

(73) Assignee: AGM Automotive, LLC, Wilmington, DE (US)

( * ) Notice: Subject to any disclaimer, the term of this patent is extended or adjusted under 35 U.S.C. 154(b) by 86 days.

(21) Appl. No.: 15/170,268

(22) Filed: Jun. 1, 2016

(65) Prior Publication Data

US 2016/0356450 A1  Dec. 8, 2016

Related U.S. Application Data (60) Provisional application No. 62/169,903, filed on Jun. 2, 2015.

(51) Int. Cl.
| | |
|---|---|
| *B60Q 3/217* | (2017.01) |
| *B60Q 3/60* | (2017.01) |
| *B60Q 1/32* | (2006.01) |
| *F21Y 115/30* | (2016.01) |
| *F21Y 115/10* | (2016.01) |

(52) U.S. Cl.
CPC .............. *B60Q 3/217* (2017.02); *B60Q 3/60* (2017.02); *B60Q 1/323* (2013.01);
(Continued)

(58) Field of Classification Search
CPC .......... B60Q 3/217; B60Q 3/60; B60Q 1/323; B60Q 2400/50; B60Q 1/38; B60Q 1/44;
(Continued)

(56) References Cited

U.S. PATENT DOCUMENTS

| | | | |
|---|---|---|---|
| 4,690,515 A | | 9/1987 | Nakajima et al. |
| 4,779,176 A | * | 10/1988 | Bornhorst .............. G03B 15/02 353/42 |

(Continued)

FOREIGN PATENT DOCUMENTS

JP        2001350073 A     12/2001

*Primary Examiner* — Bao Q Truong
(74) *Attorney, Agent, or Firm* — Volpe and Koenig, P.C.

(57) ABSTRACT

An illumination device projects light in a predetermined illumination pattern on a surface. The illumination device includes a housing having a cavity and an aperture. The illumination device includes a light module for selectively emitting the light and a screen at least partially disposed in the cavity between the light module and the aperture. The screen has at least one opening defining a base pattern configuration corresponding to the predetermined illumination pattern for aligning the light through the opening into the base pattern configuration and subsequently projecting the light through the aperture onto the surface in the predetermined illumination pattern. The illumination device includes a condensing lens disposed between the light module and the screen for collimating the light toward the screen and an objective lens arrangement disposed between the screen and the aperture for transforming the light from the base pattern configuration into the predetermined illumination pattern.

20 Claims, 10 Drawing Sheets

(52) U.S. Cl.
CPC ....... *B60Q 2400/50* (2013.01); *F21Y 2115/10* (2016.08); *F21Y 2115/30* (2016.08)

(58) Field of Classification Search
CPC ......... B60Q 1/50; B60Q 1/52; F21Y 2115/30; F21Y 2115/10; G03B 21/14; B60C 1/52; F21V 5/008; F21V 11/00; F21V 11/08; F21V 11/12; F21V 11/14
See application file for complete search history.

(56) References Cited

U.S. PATENT DOCUMENTS

| | | | |
|---|---|---|---|
| 5,575,550 A * | 11/1996 | Appeldorn | F21S 8/085 362/308 |
| 6,478,453 B2 * | 11/2002 | Lammers | F21S 6/002 353/23 |
| 6,502,970 B1 | 1/2003 | Anderson et al. | |
| 6,685,347 B2 | 2/2004 | Grutze | |
| 7,175,321 B1 * | 2/2007 | Lopez | B60Q 1/50 296/21 |
| 8,922,388 B2 | 12/2014 | Nykerk | |
| 9,321,395 B2 | 4/2016 | Ammar et al. | |
| 9,470,395 B2 * | 10/2016 | Marquardt | F21V 7/22 |
| 9,470,397 B2 * | 10/2016 | Gadegaard | F21V 7/09 |
| 2007/0109784 A1 * | 5/2007 | Kosnik | F21V 5/008 362/260 |
| 2008/0285293 A1 | 11/2008 | Sato | |
| 2009/0013922 A1 | 1/2009 | Lin | |
| 2011/0273671 A1 | 11/2011 | Chu | |
| 2014/0055252 A1 | 2/2014 | Ascencio | |
| 2014/0191859 A1 | 7/2014 | Koelsch | |

* cited by examiner

ILLUMINATION DEVICE FOR PROJECTING LIGHT IN A PREDETERMINED ILLUMINATION PATTERN ON A SURFACE

CROSS REFERENCE TO RELATED APPLICATIONS

This application claims the benefit of the U.S. provisional patent application entitled "Illumination Device for Projecting Light in a Predetermined Illumination Pattern on a Surface," having Ser. No. 62/169,903, and filed on Jun. 2, 2015.

BACKGROUND OF THE INVENTION

1. Field of Invention

The present invention relates, generally, to an illumination system and, more specifically, to an illumination device for projecting light in a predetermined illumination pattern on a surface.

2. Description of the Related Art

There is a desire within the automotive industry to provide for an illumination system for illuminating a surface within an interior of the vehicle. In particular, there is a desire to illuminate the surface with a particular pattern or design. Illumination of the interior surface with the particular pattern or design improves visibility within the interior proximate the illuminated surface in low-light situations and is considered aesthetically appealing to viewers of the illuminated surface. One solution in the industry involves an illumination system that includes a panel having the surface and a portion that is partially transparent with the partially transparent portion panel having the particular pattern or design. A plurality of illumination devices, such as light emitting diodes or optical fibers, is placed behind the panel such that the panel is between the illumination devices and the viewer. The illumination devices emit light that transmits through the partially transparent portion of the panel, which illuminates the surface of the partially transparent portion such that the viewer sees the illuminated pattern or design.

While these illumination systems known in the related art have generally performed well for their intended purpose, there remains a need in the art for an improved illumination system.

SUMMARY OF THE INVENTION

The present invention overcomes the disadvantages in the related art in an illumination device for projecting light in a predetermined illumination pattern on a surface. The illumination device includes a housing having a cavity and an aperture that opens into the cavity. The illumination device further includes a light module operatively attached to the housing for selectively emitting the light into the cavity. Furthermore, the illumination device includes a screen at least partially disposed in the cavity between the light module and the aperture. The screen has at least one opening defining a base pattern configuration corresponding to the predetermined illumination pattern for aligning the light emitted from the light module through the opening into the base pattern configuration and subsequently projecting the light through the aperture onto the surface in the predetermined illumination pattern. The illumination device further includes a condensing lens disposed between the light module and the screen for collimating the light emitted from the light module toward the screen and an objective lens arrangement disposed between the screen and the aperture for transforming the light from the base pattern configuration into the predetermined illumination pattern.

In this way, the present invention reduces the cost of manufacturing illumination systems of a vehicle in that the light may be projected onto any surface and that the surface is not required to be a particular material having specific transparency properties. Furthermore, the present invention allows for the aftermarket application of the illumination device in that the illumination may be mounted to project the light onto the surface.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
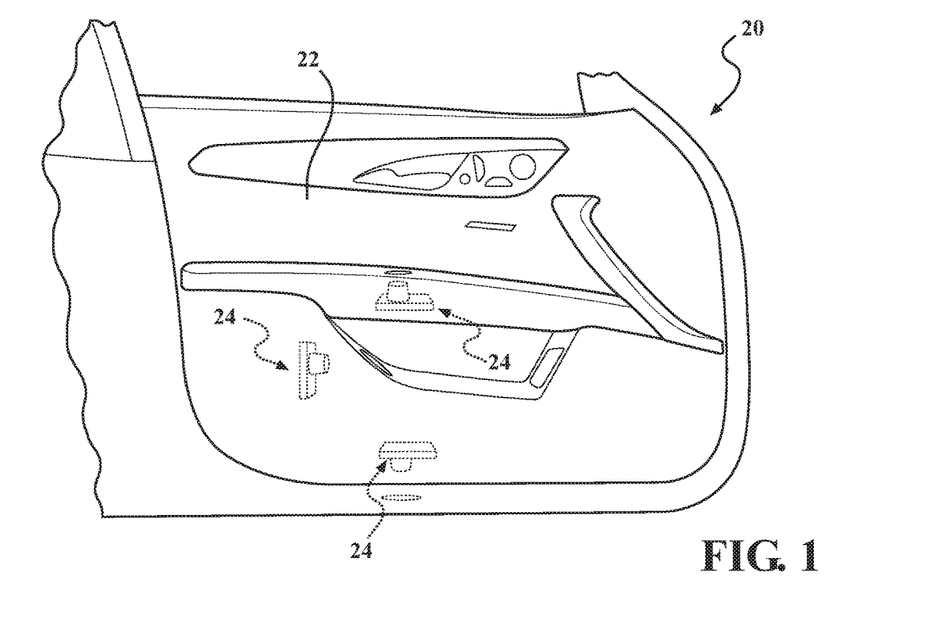
FIG. 1 is a perspective view of an illumination system having a surface and an illumination device.

Referring now to the drawings, where like numerals are used to designate like structure, an illumination system is illustrated at 20 in FIG. 1. The illumination system 20 may be adapted for use with a vehicle for transporting one or more occupants. However, it is to be appreciated that the illumination system 20 may be adapted for use in any system requiring illumination. The illumination system 20 includes a surface illustrated at 22 in FIG. 1. The surface 22 may be defined by a component within an interior of the vehicle, including but not limited to a door panel, a vehicle floor (such as on carpeting or on a floor mat in the passenger compartment or in a cargo area), and a vehicle ceiling. Furthermore, the surface 22 may be defined by any suitable component of an exterior of the vehicle, including, but not limited to, a body panel, a vehicle glass, and a wheel. It is to be appreciated that the surface 22 may be defined by any object proximate to the vehicle, such as the ground upon which the vehicle is disposed. It is also to be appreciated that the illumination system 20 may be a plurality of surfaces 22.

Figure 2:
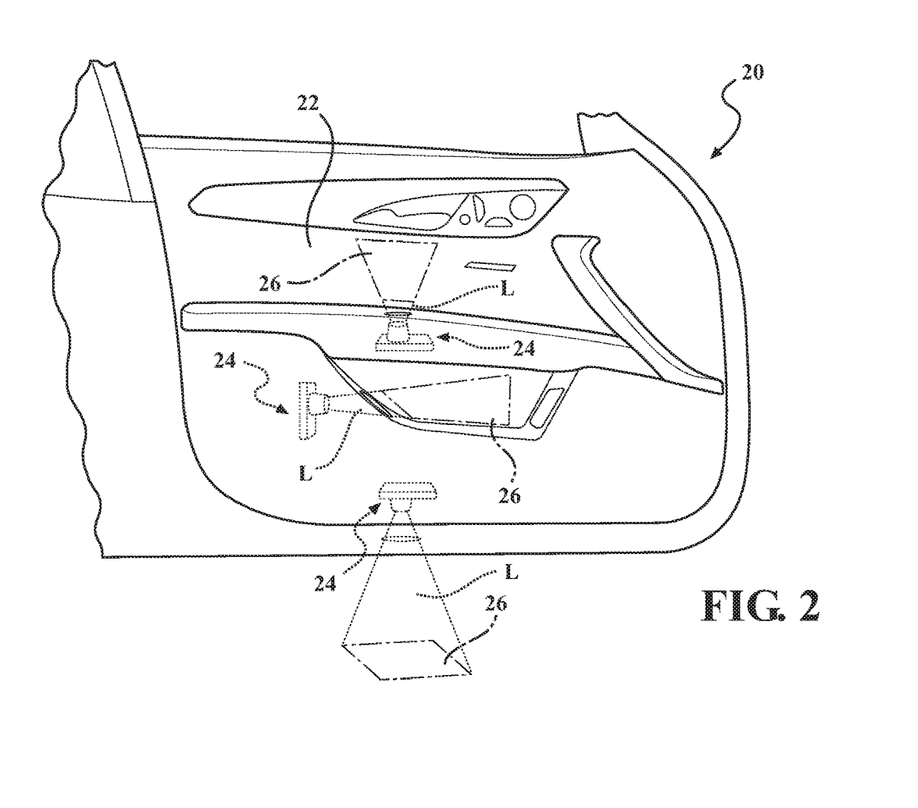
FIG. 2 is a perspective view of the illumination system with the illumination device projecting light onto the surface.

The illumination system 20 includes an illumination device 24, commonly referred to in the art as a shadow-lamp or a logo-lamp, for projecting light L in a predetermined illumination pattern 26 on the surface 22, as shown in FIG. 2. The predetermined illumination pattern 26 may be any shape, logo, pattern, etc. and may be any configuration, orientation, etc., of the light L. As such, the predetermined illumination pattern 26 is contemplated when designing the illumination device 24, itself, as well as the position of the illumination device 24 relative to the surface 22. It is to be appreciated that the illumination device 24 may be a plurality of illumination devices 24 for projecting light L in a predetermined illumination pattern 26 on the surface 22 or on the plurality of surfaces 22 (which is illustrated in FIGS. 1 and 2 for demonstrative purposes only).

Figure 3:
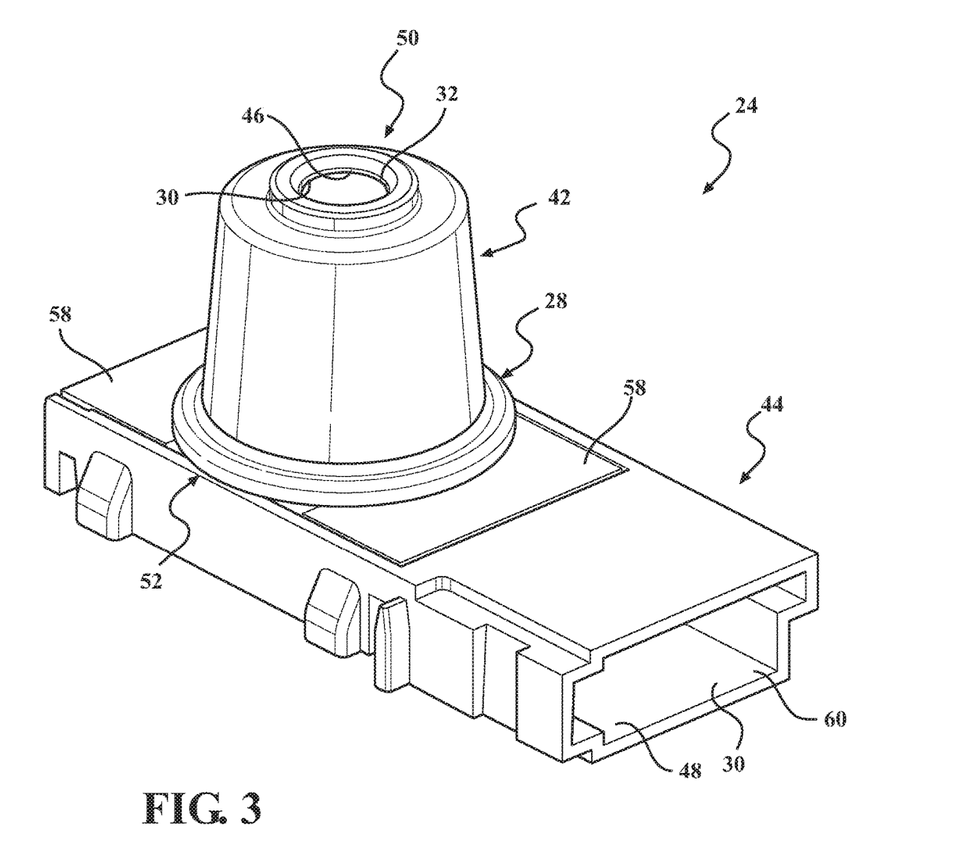
FIG. 3 is a perspective view of the illumination device.
Figure 6:
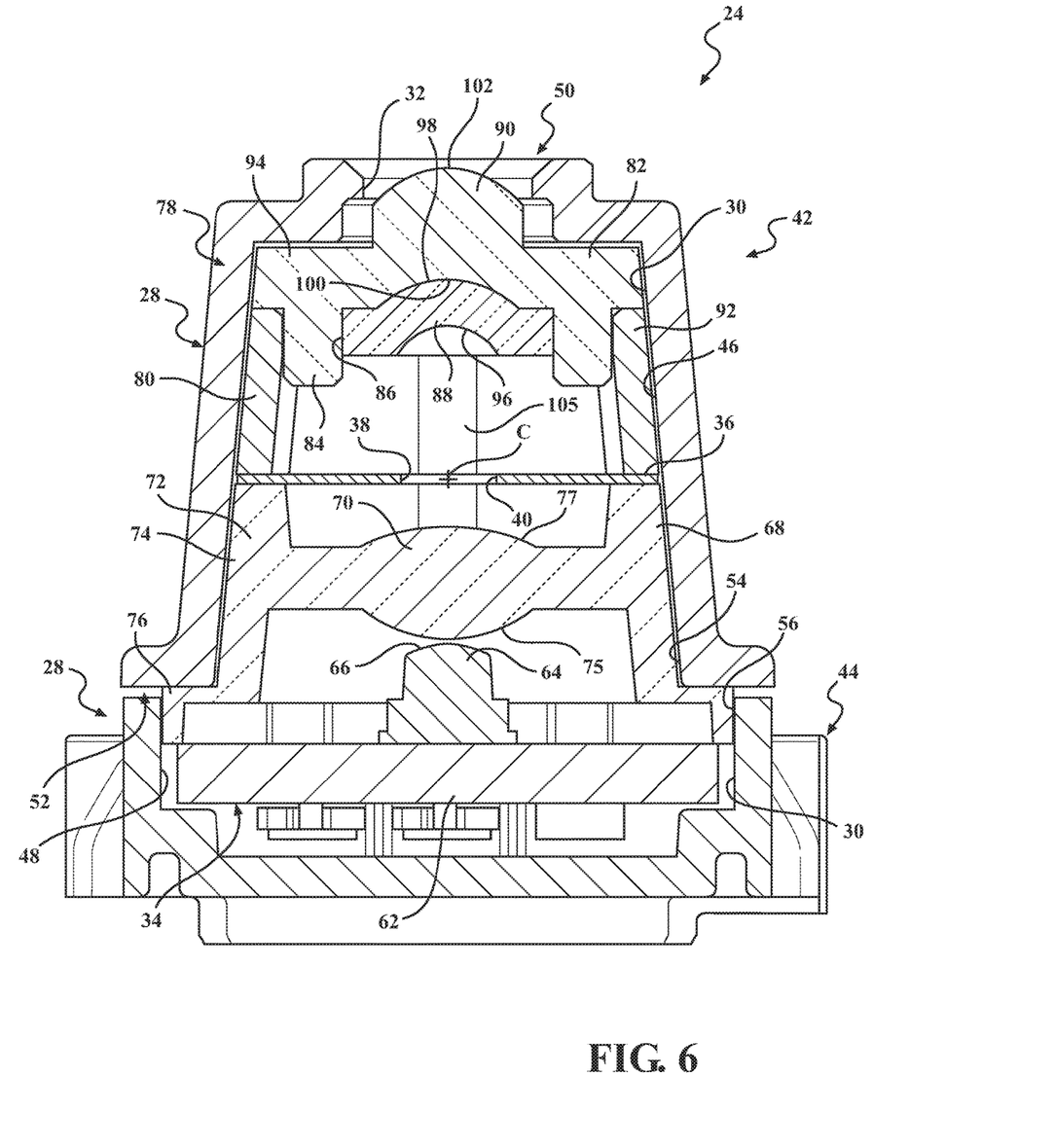
FIG. 6 is a cross-sectional view of the illumination device.
Figure 8:
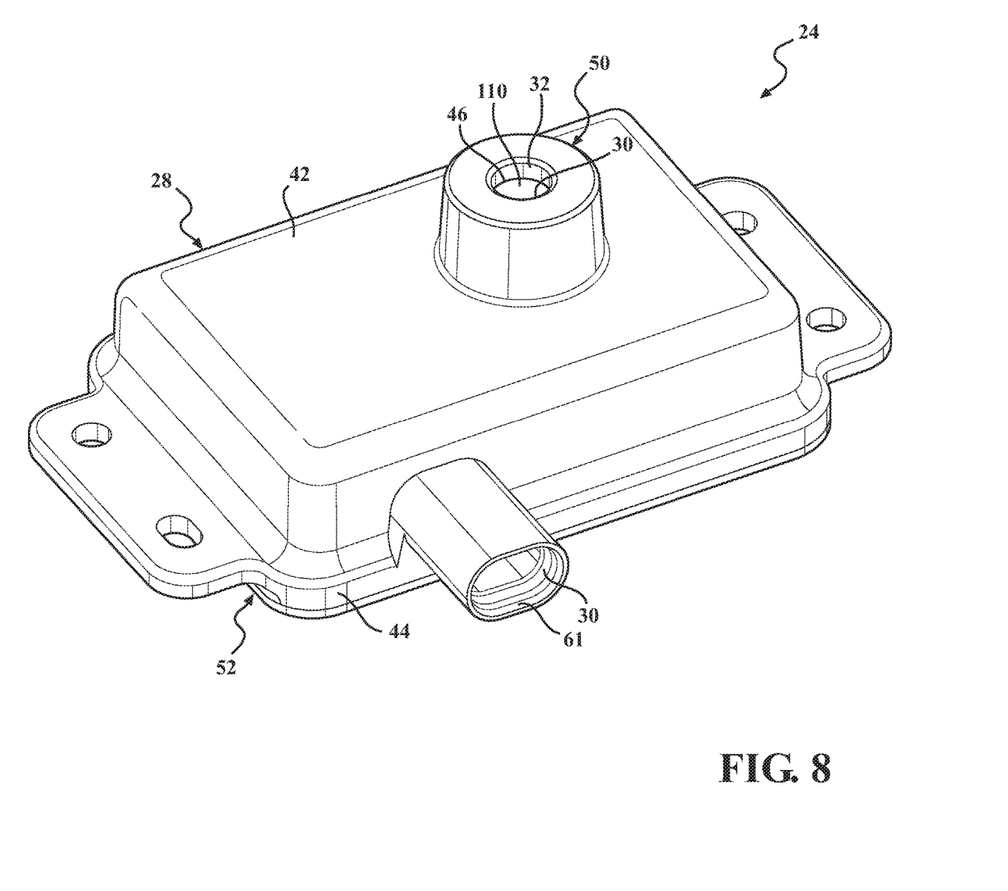
FIG. 8 is a perspective view of another embodiment of the illumination device.
Figure 11:
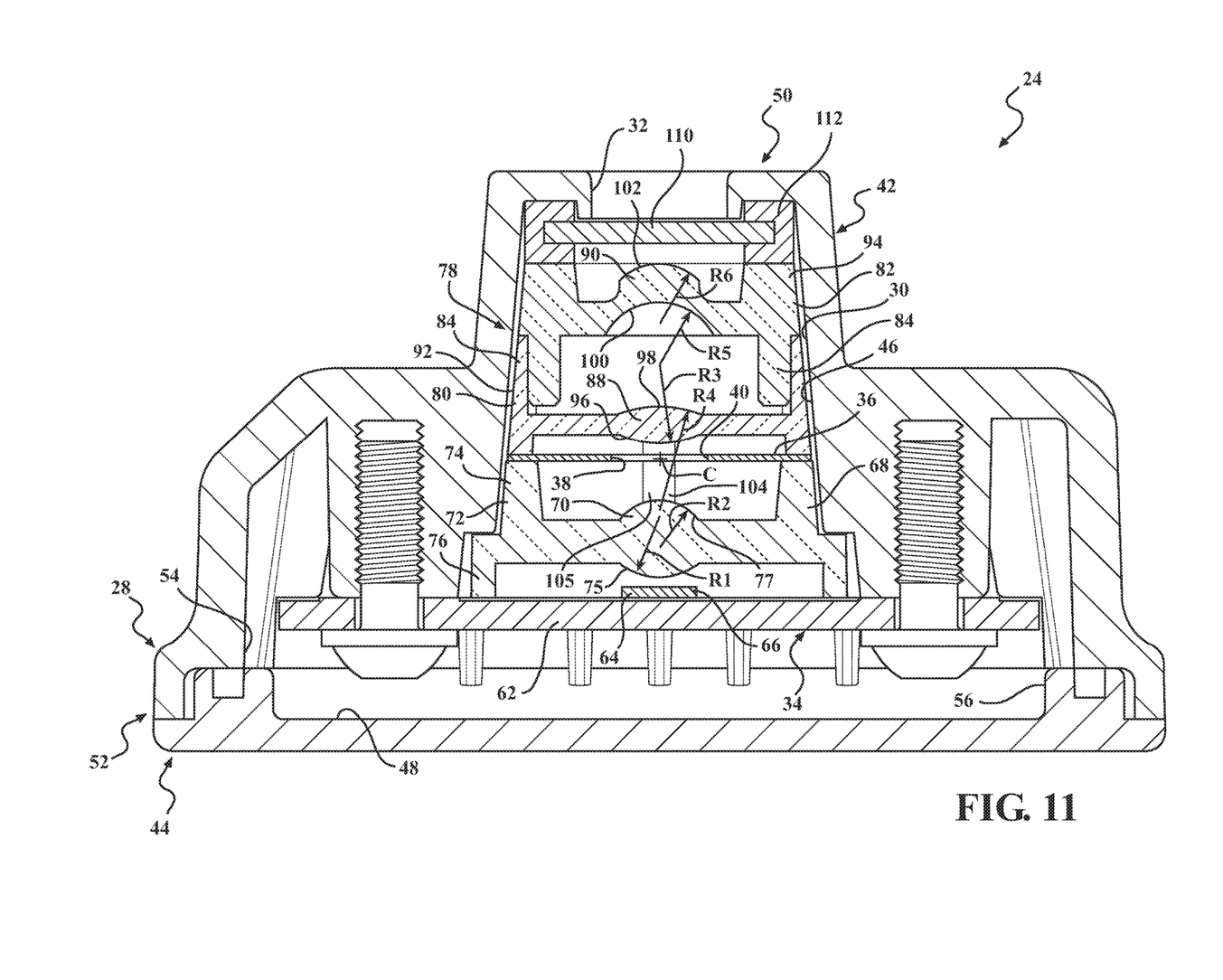
FIG. 11 is a cross-sectional view of the illumination device shown in FIG. 8.

As shown in FIGS. 3 and 8, the illumination device 24 includes a housing 28 having a cavity 30 and an aperture 32 that opens into the cavity 30. As shown in FIGS. 6 and 11, the illumination device 24 further includes a light module 34 operatively attached to the housing 28 for selectively emitting the light L into the cavity 30. Furthermore, the illumination device 24 includes a screen 36 at least partially disposed in the cavity 30 between the light module 34 and the aperture 32. The screen 36 has at least one opening 38 defining a base pattern configuration 40 corresponding to the predetermined illumination pattern 26 for aligning the light L emitted from the light module 34 through the opening 38 into the base pattern configuration 40 and subsequently projecting the light L through the aperture 32 onto the surface 22 in the predetermined illumination pattern 26.

Figure 4:
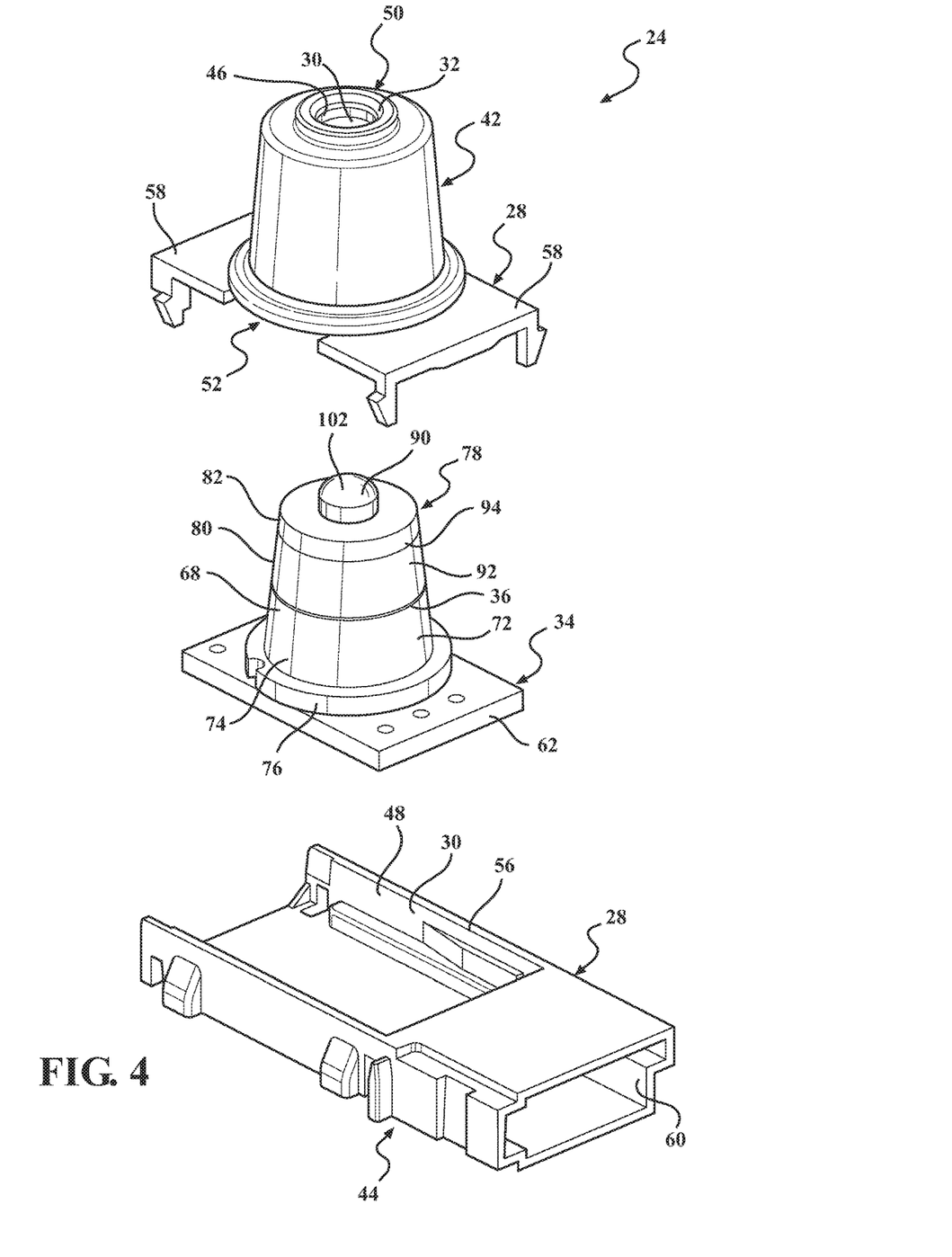
FIG. 4 is a partially exploded perspective view of the illumination device showing a housing having first and second sections, a light module, a condensing lens, a screen, and an objective lens arrangement.
Figure 9:
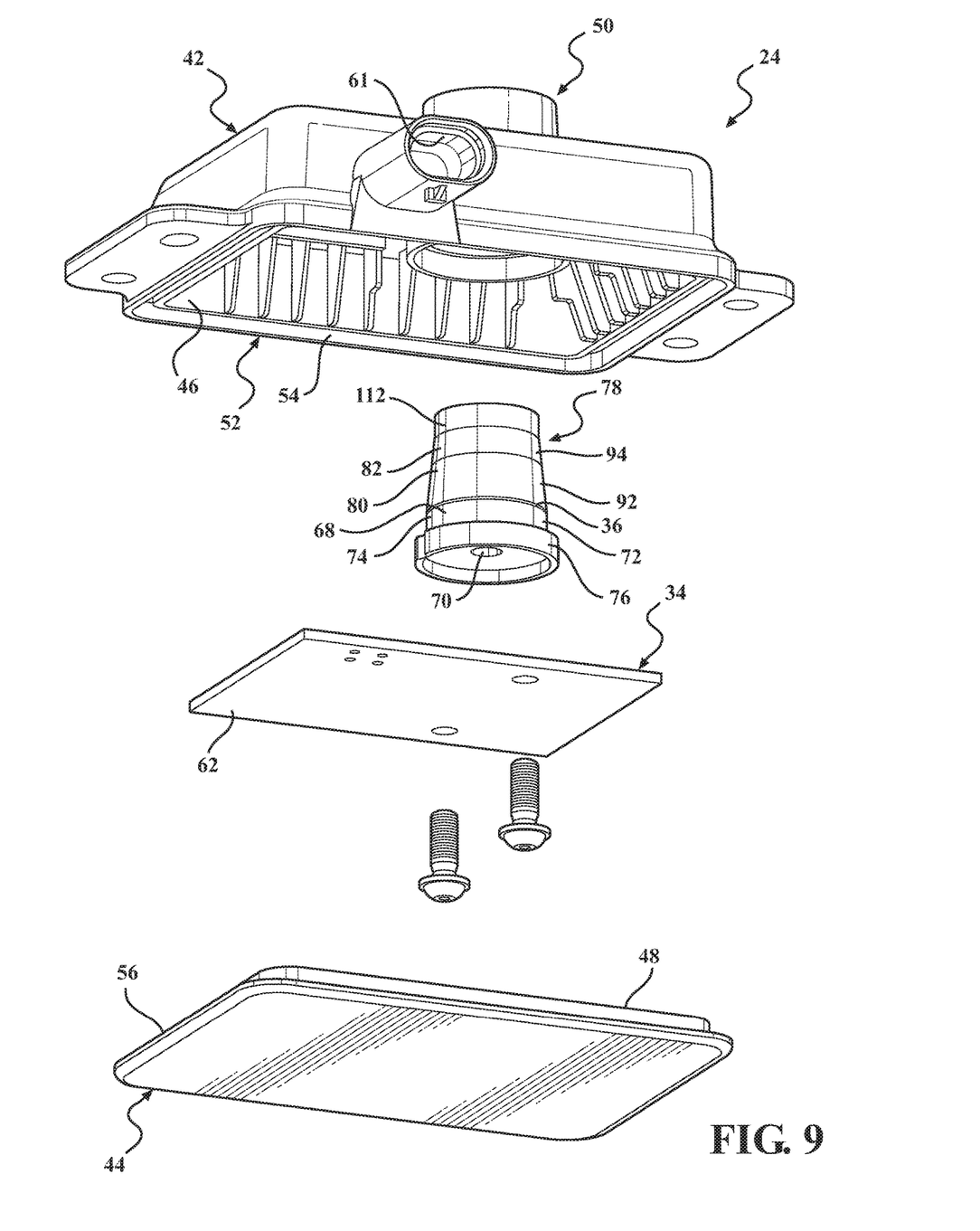
FIG. 9 is a partially exploded perspective view of the illumination device shown in FIG. 8, showing the housing having first and second sections, the light module, the condensing lens, the screen, the objective lens arrangement, and a seal.

As shown in FIGS. 4 and 9, the housing 28 may have a first section 42 and a second section 44 with the first section 42 having the aperture 32. The first and second sections 42, 44 cooperate to define the cavity 30. More specifically, the first section 42 defines a first portion 46 of the cavity 30 and the second section 44 defines a second portion 48 of the cavity 30.

As shown in FIG. 4, the first section 42 may extend between first and second ends 50, 52 have a substantially cylindrical configuration between the first and second ends 50, 52. Alternatively, the first section 42 may have a substantially cuboidal configuration as shown in FIG. 9. It is to be appreciated that the first section 42 may have any suitable shape. The first section 42 has the aperture 32 at the first end 50 with the aperture 32 opening into the first portion 46 of the cavity 30. As shown in FIGS. 6 and 11, the first section 42 has an entrance opening 54 at the second end 52 that opens into the first portion 46 of the cavity 30.

Referring now to FIG. 4, the second section 44 may have a substantially cuboidal configuration. Alternatively, the second section 44 may have a substantially planar configuration as shown in FIG. 9. It is to be appreciated that the second section 44 may have any suitable shape. The second section 44 may have a first opening 56 adjacent the entrance opening 54 of the first section 42 for permitting interconnection of the first and second portions 46, 48 of the cavity 30. As shown in FIGS. 3 and 4, the housing 28 may include a pair of plates 58 that are adapted to be received by and disposed in the first opening 56 and abut the first and second sections 42, 44 to close the excess first opening 56 about the first section 42. The second section 44 may have a second opening 60 spaced from the first opening 56 for permitting electrical coupling with the light module 34. Alternatively, the first section 42 may have an electrical opening 61 for permitting electrical coupling with the light module 34 as shown in FIGS. 8 and 9. The second opening 60 (FIGS. 3 and 4) or the electrical opening 61 (FIGS. 8 and 9) may accept an electrical connector (which is not shown but is generally understood in the art). The electrical connector couples with the light module 34 to provide electricity to the light module 34. The light module 34 may be at least partially disposed within each of the first and second portions 46, 48 of the first and second sections 42, 44, respectively. The light module 34 may extend through each of the entrance opening 54 of the first section 42 and the first opening 56 of the second section 44. It is to be appreciated that the light module 34 may be positioned anywhere within the cavity 30 of the housing 28.

As shown in FIGS. 6 and 11, the light module 34 may include a printed circuit board 62 supporting a light source 64 with the printed circuit board 62 coupled to the housing 28. The printed circuit board 62 may be disposed within the second portion 48 of the cavity 30 and mounted to the second section 44. The printed circuit board 62 selectively provides electricity to the light source 64 for selectively emitting the light L therefrom. Furthermore, the amount of current provided by the printed circuit board 62 may vary depending on the application. In one non-limiting example, the printed circuit board 62 may provide greater than zero milliamps (mA) of current and less than or equal to 50 mA of current when used in the interior of the vehicle. As another non-limiting example the printed circuit board 62 may provide greater than or equal to 350 mA of current and less than or equal to 700 mA of current.

Figure 5:
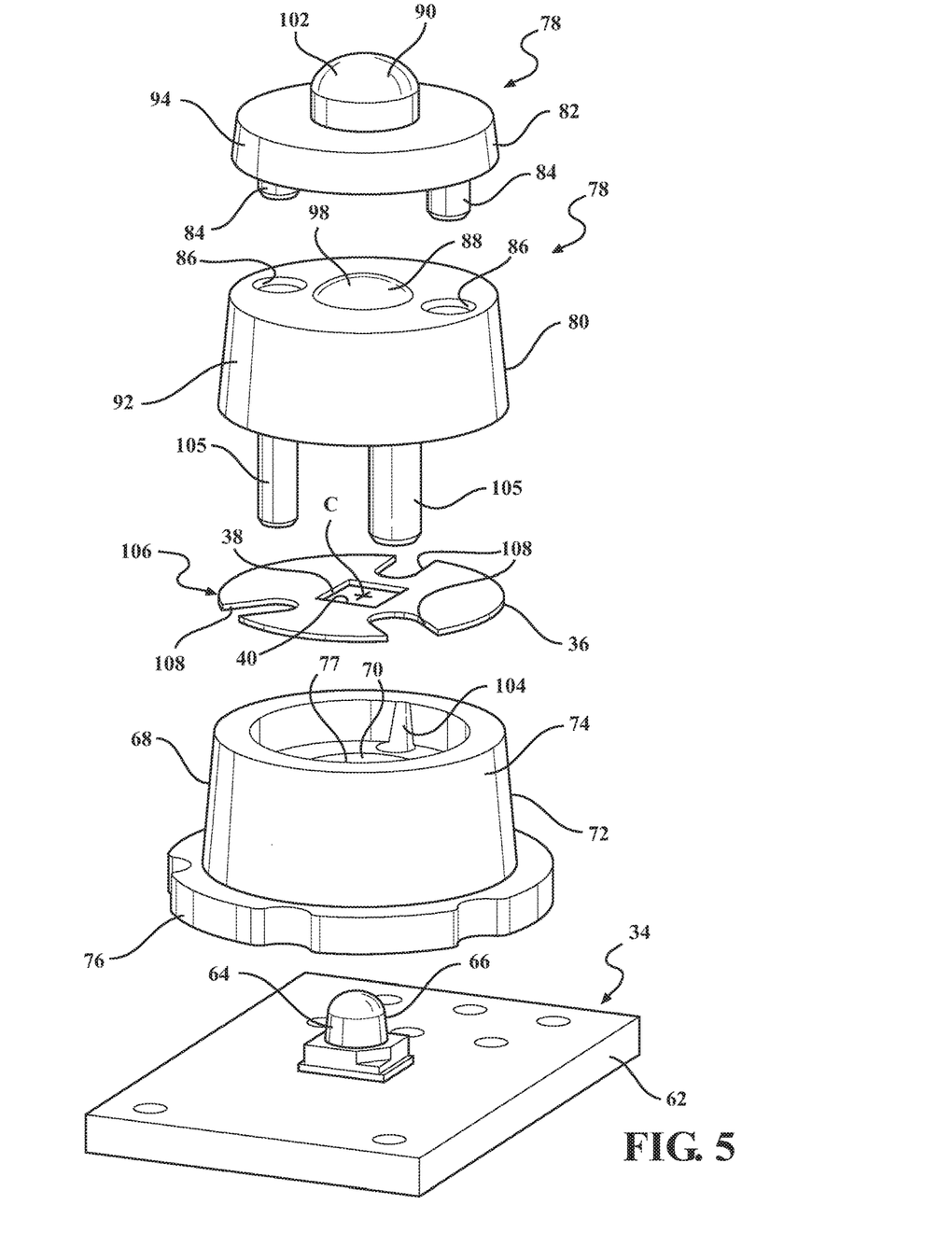
FIG. 5 is an exploded perspective view of the light module, the condensing lens, the screen, and the objective lens arrangement.
Figure 10:
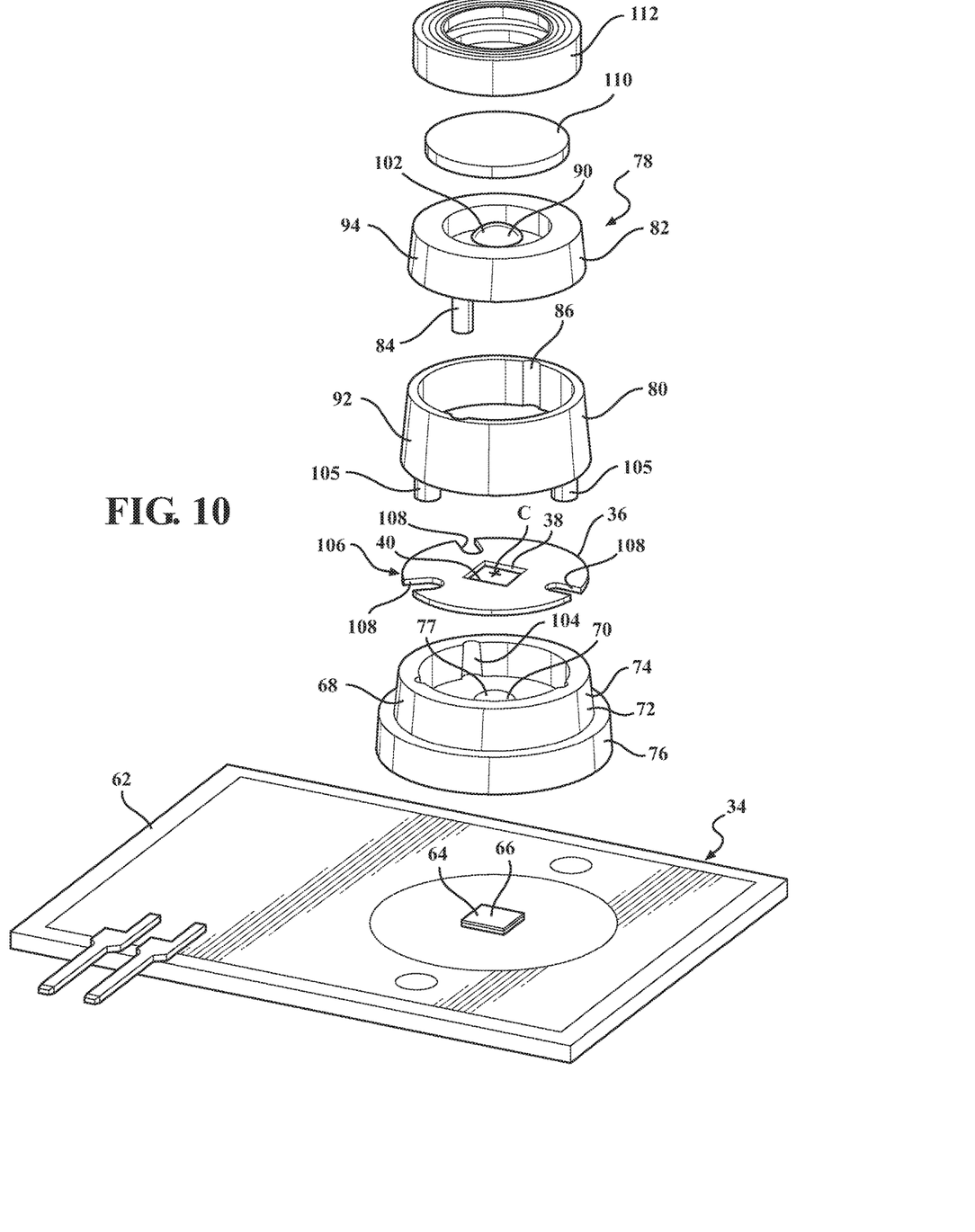
FIG. 10 is an exploded perspective view of the light module, the condensing lens, the screen, the objective lens arrangement, and the seal shown in FIG. 9.

As shown in FIGS. 5 and 10, the light module 34 may include a semi-conductor light source 66. More specifically, the light source 64 described above may be further defined as the semi-conductor light source 66. In one embodiment, the semi-conductor light source 66 is supported by and electrically coupled to the printed circuit board 62. As such, the semi-conductor light source 66 may extend from the printed circuit board 62 in the second portion 48 of the cavity 30, through the first opening 56 of the second section 44, through the entrance opening 54 of the first section 42, and into the first portion 46 of the cavity 30, as shown in FIG. 6, such that the semi-conductor light source 66 faces the aperture 32 for emitting the light L toward the aperture 32. It is to be appreciated that the semi-conductor light source 66 may be anywhere in the cavity 30.

The semi-conductor light source 66 may be further defined as a light emitting diode. Alternatively, the semi-conductor light source 66 may be further defined as a laser light source. In any embodiment, the semi-conductor light source 66 is capable of emitting any type of light. For example, the semi-conductor light source 66 may be capable of emitting visible light across the color spectrum. As another example, the semi-conductor light source 66 may also be capable of emitting non-visible light such as ultra-violet light which may illuminate a fluorescent material on the surface 22. It is to be appreciated that the semi-conductor light source 66 may be a single-color semi-conductor light source capable of emitting what is typically referred to as visible white light. It is also to be appreciated that the semi-conductor light source 66 may be a multi-color semi-conductor light source with the semi-conductor light source 66 capable of emitting specific colors of the visible spectrum of the light L. For example, the semi-conductor light source 66 may be a red-green-blue (RGB) L.E.D. capable of individually emitting visible red, green, and blue light, or in combination emitting colored light formed by the combination of at least two of the visible red, green, and blue light.

Figure 7:
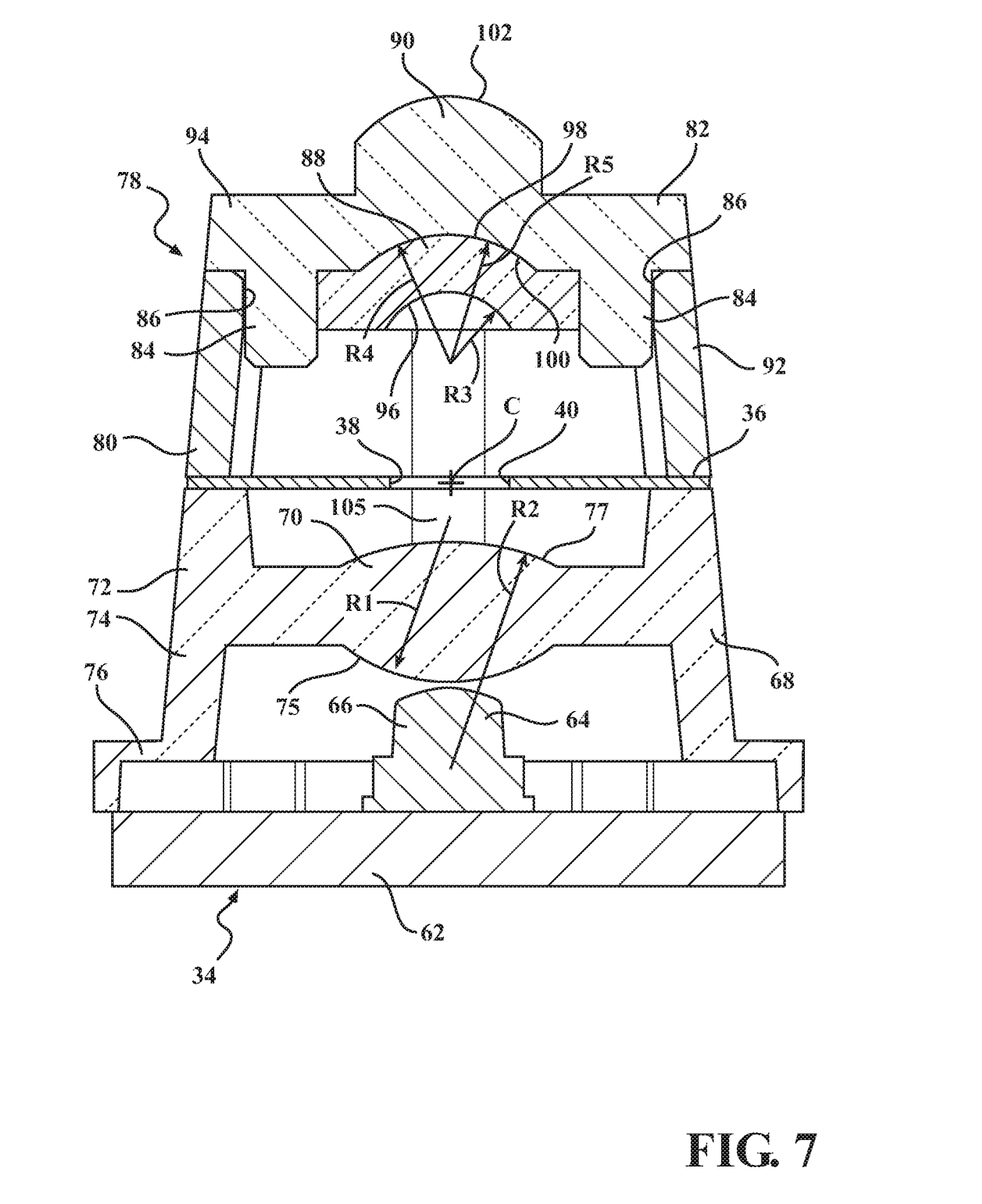
FIG. 7 is a cross-sectional view of the light module, the condensing lens, the screen, and the objective lens arrangement.

In addition, the semi-conductor light source 66 may be capable of emitting the light L in any direction. For example, the semi-conductor light source 66 may be a 60 degree semi-conductor light source as shown in FIGS. 6 and 7, with the semi-conductor light source 66 emitting the light L in a conical shape having an angle of 60 degrees between the outer most light L as measured along a plane extending through a center of the light L. It is to be appreciated that semi-conductor light source 66 may be a 120 degree semi-conductor light source. It is also be appreciated that the semi-conductor light 66 source may emit the light L at any suitable angle.

In any embodiment, the semi-conductor light source 66 is capable of emitting the light L at any intensity. It will be appreciated that the semi-conductor light source 66 could be of any suitable type or configuration and could include any suitable number of semi-conductor light sources 66 without departing from the scope of the present invention.

As shown in FIGS. 5, 6, 10, and 11, the illumination device 24 may further include a condensing lens 68 disposed between the light module 34 and the screen 36 for collimating the light L emitted from the light module 34 toward the screen 36. The condensing lens 68 may have a central portion 70 having a circular configuration and a mounting body 72 disposed about a periphery of the central portion 70.

As shown in FIGS. 6, 7, and 11, the mounting body 72 is disposed about the light source 64. More specifically, the mounting body 72 has a wall 74 disposed radially about the central portion 70 and extending toward the printed circuit board 62, with a flange 76 extending from the wall 74 to abut the printed circuit board 62. The condensing lens 68 is mounted to the printed circuit board 62 at the flange 76. The light source 64 is disposed within the wall 74 below the central portion 70. As such, the light L emitted from the light source 64 is retained within the wall 74, the printed circuit board 62, and the central portion 70. In one embodiment, at least the central portion 70 may be transparent such that the light L may pass through the central portion 70. The mounting body 72 may be opaque such that the light L may not pass through the mounting body 72.

The mounting body 72 and the printed circuit board 62 redirect the light L emitted from the light source 64 toward the central portion 70 where the light L can pass therethrough. It is to be appreciated that the central portion 70 and the mounting body 72 may have any suitable amount of transparency. Conversely, the central portion 70 and the mounting body 72 may have any suitable amount of opaqueness. In one embodiment, the central portion 70 is in axial alignment with the light source 64 and the aperture 32. It is to be appreciated that the central portion 70 may be misaligned from the light source 64 and the aperture 32.

The central portion 70 may have a convex configuration. More specifically, the central portion 70 may have an entrance surface 75 and an exit surface 77 each having an arcuate configuration with the entrance surface 75 bowing outwardly toward the light source 64 and the exit surface 77 bowing outwardly toward the aperture 32. As shown in FIGS. 7 and 11, the entrance surface 75 has a radius R1 and the exit surface 77 has a radius R2 with the radius R2 of the exit surface 77 being greater than the radius R1 of the entrance surface 75. It is to be appreciated that the radii R1 and R2 may have any suitable relationship for collimating the light L. As such, the entrance and exit surfaces 75, 77 are configured to cooperatively interact to collimate the light L. The convex configuration collimates the light L such that the light L emitted from the light source 64 in random, transverse directions may be gathered in the central portion 70 of the condensing lens 68 and redirected into substantially parallel light L directed toward the aperture 32. For example, if the semi-conductor light source 66 is the 60 degree semi-conductor light source, the central portion 70 collimates the light L emitted in a 60 degree conical shape into a column of substantially parallel light L. It is to be appreciated that the condensing lens 68 may be any suitable configuration (such as a concave configuration), may be any suitable first and second radii R1, R2, and may be any suitable distance from the semi-conductor light source 66 for collimating the light L.

As shown in FIGS. 4 and 9, the illumination device 24 may further include an objective lens arrangement 78 disposed between the screen 36 and the aperture 32 for transforming the light L from the base pattern configuration 40 into the predetermined illumination pattern 26. The objective lens arrangement 78 may perform any one of or any combination of the functions of repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size (i.e., the focal length). It is to be appreciated that the objective lens arrangement 78 may perform further functions not specifically described herein.

As shown in FIGS. 5 and 10, the objective lens arrangement 78 may include a first lens 80 and a second lens 82 with the first lens 80 disposed between the light module 34 and the second lens 82. As such, the second lens 82 is disposed between the first lens 80 and the aperture 32. It is to be appreciated that the objective lens arrangement 78 may be comprised of any number of lenses.

In one embodiment, the light source 64, the condensing lens 68, the screen 36, the first lens 80, the second lens 82, and the aperture 32 are generally linearly aligned. The general linear alignment increases the efficiency of the illumination device 24 by facilitating a direct path for the light L from the emission of the light L at the light source 64 to the passage of the light L out of the cavity 30 of the housing 28 through the aperture 32. It is to be appreciated that these components may be misaligned.

As shown in FIGS. 5-7, 10, and 11, the second lens 82 may have a plurality of posts 84 and the first lens 80 may have a plurality of holes 86 with the plurality of posts 84 individually disposed in the plurality of holes 86 to index the first and second lenses 80, 82 relative to one another. More specifically, each of the first and second lenses 80, 82 may have a central body 88, 90 and a mounting frame 92, 94 radially disposed about the central body 88, 90 with the mounting frame 94 of the second lens 82 having the plurality of posts 84 and the mounting frame 92 of the first lens 80 having the plurality of holes 86. As described above, the first and second lenses 80, 82 may be aligned with the light source 64, the condensing lens 68, the screen 36, and the aperture 32. More specifically, the central body 88, 90 of each of the first and second lenses 80, 82 may be aligned with the light source 64, the central portion 70 of the condensing lens 68, the screen 36, and the aperture 32.

The plurality of posts 84 are circumferentially disposed on the mounting frame 94 about the central body 90 of the second lens 82 and the plurality of holes 86 are circumferentially disposed on the mounting frame 92 about the central body 88 of the first lens 80. Furthermore, the posts 84 and the holes 86 are aligned such that each of the posts 84 are independently disposed in each of the holes 86 for indexing the first and second lenses 80, 82 relative to one another.

It is to be appreciated that the opposite may be true, i.e., the first lens 80 may have the posts 84 and the second lens 82 may have the holes 86. It is also to be appreciated that the first and second lenses 80, 82 may be indexed relative to one another in any suitable manner.

In one embodiment, at least the central body 88, 90 of each of the first and second lenses 80, 82 is transparent such that the light L may pass through the central body 88, 90. The mounting frame 92, 94 of each of the first and second lenses 80, 82 is opaque such that the light L may not pass through the mounting frame 92, 94. As such, the mounting frame 92, 94 of each of the first and second lenses 80, 82 redirect the light L emitted from the light source 64 toward the central body 88, 90 of each of the first and second lenses 80, 82 where the light L can pass therethrough. It is to be appreciated that the central body 88, 90 and the mounting frame 92, 94 of each of the first and second lenses 80, 82 may have any suitable amount of transparency. Conversely, the central body 88, 90 and the mounting frame 92, 94 of each of the first and second lenses 80, 82 may have any suitable amount of opaqueness.

As shown in FIGS. 6, 7, and 11, the first lens 80 may have first and second surfaces 96, 98 spaced from one another and the second lens 82 may have first and second surfaces 100, 102 spaced from one another with the first surface 96 of the first lens 80 facing the light module 34, the second surface 102 of the second lens 82 facing the aperture 32, and with the second surface 98 of the first lens 80 and the first surface 100 of the second lens 82 facing one another. In one embodiment, the second surface 98 of the first lens 80 abuts the first surface 100 of the second lens 82 as shown in FIGS. 6 and 7. It is to be appreciated that the second surface 98 of the first lens 80 and the first surface 100 of the second lens 82 may be spaced from each other as shown in FIG. 11.

As shown in FIGS. 7 and 11, each of the first and second surfaces 96, 98, 100, 102 of the first and second lenses 80, 82 may be curved with each surface having a radius R3, R4, R5, R6. In one embodiment, each of the first and second surfaces 96, 98, 100, 102 of each of the first and second lenses 80, 82 is curved at the central body 88, 90 of each of the first and second lenses 80, 82. Furthermore, as shown in FIGS. 6 and 7, the first surface 96 of the first lens 80 may have a substantially concave configuration and the second surface 98 of the first lens 80 may have a substantially convex configuration. Likewise, the first surface 100 of the second lens 82 may have a substantially concave configuration and the second surface 102 of the second lens 82 may have a substantially convex configuration. As such, the first surface 96, 100 of each of the first and second lenses 80, 82 bows inwardly at the central body 88, 90, away from the light source 64. The second surface 98, 102 of each of the first and second lenses 80, 82 bows outwardly at the central body 88, 90, toward the aperture 32. In one embodiment shown in FIG. 11, the first surface 100 of the second lens 82 may have a substantially convex configuration. As shown in FIG. 6, the radius R4 of the second surface 98 of the first lens 80 may be substantially equal to the radius R5 of the first surface 100 of the second lens 82 to facilitate abutment of the first and second lenses 80, 82. The radius R4 of the second surface 98 of the first lens 80 may be greater than the radius R3 of the first surface 96 of the first lens 80. Further, the radius R5 of the first surface 100 of the second lens 82 may be substantially equal to the radius R6 of the second surface 102 of the second lens 82.

It is to be appreciated that these relationships are exemplary in purpose. It is also to be appreciated that the first and second lenses 80, 82 may be configured in any way suitable for performing desired functions including, but not limited to, repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size. Such alternative configurations include, but are not limited to, spacing apart the first and second lenses 80, 82 and varying the radius R3, R4, R5, R6 and/or the shape (e.g., concave or convex) of the first and second surfaces 96, 98, 100, 102 of the first and second lenses 80, 82. It is to be appreciated that the first and second surfaces 96, 98, 100, 102 of the first and second lenses 80, 82 may have any suitable size, shape, and configuration without escaping the scope of the present invention.

The condensing lens 68 and the first and second lenses 80, 82 may be comprised of polycarbonate. It is to be appreciated that the condensing lens 68 and the first and second lenses 80, 82 may be comprised of poly(methyl methacrylate) ("PMMA"), glass, silicone, or any other suitable material for allowing transmission of the light L therethrough. It is also to be appreciated that the condensing lens 68 and the first and second lenses 80, 82 may be individually comprised of varying material. In one embodiment, the condensing lens 68 and the first lens 80 comprise the same material. It is to be appreciated that certain materials, such as silicone, have properties conducive to light having an increased intensity, such as the light L emitted when used with the exterior of the vehicle.

The first lens 80 may have a plurality of studs 105. The condensing lens 68 may be fixed to the housing 28 and may define a plurality of pockets 104. In one embodiment, the mounting body 72 of the condensing lens 68 has the pockets 104 with the pockets 104 circumferentially disposed about the central portion 70. The studs 105 and the pockets 104 are aligned such that each of the studs 105 are independently disposed in each of the pockets 104.

As shown in FIGS. 5 and 10, the illumination device 24 may further include an indexing interface 106 that aligns the screen 36 relative to the housing 28 for positioning the predetermined illumination pattern 26 on the surface 22. The indexing interface 106 may include a plurality of circumferentially-spaced voids 108. The screen 36 may have the voids 108. The screen 36 may be disposed between the objective lens arrangement 78 and the condensing lens 68, with each of the plurality of studs 105 individually disposed within the plurality of voids 108 and the plurality of pockets 104 to align and fix the screen 36 relative to the housing 28.

The alignment of the screen 36 refers to the positioning of the base pattern configuration 40 relative to the housing 28 such that the light L exits the screen 36 in the base pattern configuration 40, passes through the aperture 32, and is projected onto the surface 22 in the predetermined illumination pattern 26 with the predetermined illumination pattern 26 rotationally aligned on the surface 22 in a desired orientation. In one embodiment, the housing 28 is fixed relative to the surface 22. As such, the rotational alignment of the predetermined illumination pattern 26 in the desired orientation is dictated by the alignment of the screen 36 relative to the housing 28.

The screen 36 may have a substantially thin and flat configuration parallel to the aperture 32 with said screen 36 sandwiched between said condensing lens 68 and said first lens 80. The screen 36 may have an axial center C that is aligned with the light source 64 and the aperture 32. The screen 36 extends radially from the axial center C such that the screen 36 is disposed between the mounting body 72 of the condensing lens 68 and the mounting frame 92 of the first lens 80.

The plurality of voids 108 are disposed about and spaced from the axial center C. As described above, the plurality of voids 108 are configured to have the studs 105 disposed therein. Because the condensing lens 68 is mounted to the printed circuit board 62, which in-turn is mounted to the housing 28, the coupling of the screen 36 to the condensing lens 68 mounts the screen 36 relative to the housing 28. As such, the orientation of the voids 108 about the central axis dictates the orientation of the screen 36 relative to the housing 28.

Therefore, the desired orientation of the base pattern configuration 40 relative to the housing 28 is considered when the voids 108 are positioned about the central axis. It is to be appreciated that the voids 108 may be disposed on other components, such as the first lens 80 or the condensing lens 68, with the screen 36 having studs 105 to engage the voids 108. Likewise, the indexing interface 106 may be any suitable configuration to align and fix the screen 36 relative to the housing 28.

The at least one opening 38 of the screen 36 having the base pattern configuration 40 may be positioned at or about the axial center C. It is to be appreciated that the at least one opening 38 may be positioned anywhere on the screen 36. The at least one opening 38 of the screen 36 having the base pattern configuration 40 permits the transmission of the light L therethrough. As such the at least one opening 38 is shaped such that the light L transmitted therethrough is similar to the predetermined illumination pattern 26 on the surface 22. It is to be appreciated that the screen 36 may have a transparent or semi-transparent panel disposed within the at least one opening 38. For example, the panel may be colored such that the light L transmitted through the panel takes on the colored properties of the panel which is then projected on the surface 22. It is to be appreciated that the at least one opening 38 of the screen 36 may be any suitable configuration for permitting the transmission of the light L therethrough in the base pattern configuration 40.

Because the opening 38 of the screen 36 having the base pattern configuration 40 dictates the predetermined illumination pattern 26 on the surface 22, significant consideration is given to the shape, configuration, and orientation of the opening 38 relative to the housing 28 during the design of the illumination device 24. Likewise, the orientation of the housing 28 relative to surface 22 (such as the rotational position of the housing 28 and the angle at which the light L is projected from the housing 28 onto the surface 22) is given consideration when designing the illumination system 20 to yield the desired predetermined illumination pattern 26. Furthermore, the effect that each of the condensing lens 68 and the objective lens arrangement 78 have on the light L as the light L projects from the light module 34 through the aperture 32 is also given consideration when determining the size, shape, configuration, and material of the condensing lens 68 and the objective lens arrangement 78.

In one embodiment, the illumination device 24 may further include a disk 110 disposed between the aperture 32 and the objective lens arrangement 78. The illumination device 24 may further include a seal 112 engaging each of the disk 110 and the housing 28 about the aperture 32. The disk 110 and the seal 112 close the aperture 32 and seal the housing 28 at the aperture 32 to prevent a fluid from permeating into the cavity 30 of the housing 28. Such a configuration is advantageous when used in the exterior of the vehicle. However, it is to be appreciated that the disk 110 and the seal 112 may be used in the interior of the vehicle.

Referring generally to the configuration shown in FIGS. 6 and 11, to project the light L on the surface 22 in the predetermined illumination pattern 26, the light source 64 of the light module 34 emits the light L in a plurality of directions. The light L transmits through the condensing lens 68 and is collimated such that the light L is substantially parallel. The light L transmits through the at least one opening 38 of the screen 36 and is configured into the base pattern configuration 40. The light L then transmits through the objective lens arrangement 78 where the light L is configured from the base pattern configuration 40 into the orientation that will be the predetermined illumination pattern 26. If the illumination device 24 has the disk 110, the light L transmits through the disk 110. The light L then passes through the aperture 32 and is projected onto the surface 22 in the predetermined illumination pattern 26, as shown in FIG. 2. Because the illumination device 24 and the surface 22 are fixed relative to one another and because the screen 36 is fixed within the illumination device 24, the predetermined illumination pattern 26 is static on the surface 22.

In this way, the present invention reduces the cost of manufacturing the illumination systems of the vehicle. Specifically, the light may be projected onto any surface. As such, the surface is not required to be a particular material having specific transparency properties to allow for light to be projected therethrough from behind the surface. Furthermore, the present invention allows for the aftermarket application of the illumination device in that the illumination may be mounted to project the light onto the surface. It will be appreciated that the present invention is compatible with and can be incorporated modularly into a number of different types of applications within vehicles without necessitating significant changes to existing manufacturing equipment and/or tooling.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An illumination device for projecting light in a predetermined illumination pattern on a surface, said illumination device comprising:
   a housing having a cavity and an aperture that opens into said cavity;
   a light module operatively attached to said housing for selectively emitting the light into said cavity;
   a screen at least partially disposed in said cavity between said light module and said aperture and having at least one opening defining a base pattern configuration corresponding to the predetermined illumination pattern for aligning the light emitted from said light module through said opening into said base pattern configuration and subsequently projecting the light through said aperture onto the surface in the predetermined illumination pattern;
   an indexing interface that circumferentially aligns said screen relative to said housing for positioning the predetermined illumination pattern on the surface;

a condensing lens disposed between said light module and said screen for collimating the light emitted from said light module toward said screen; and an objective lens arrangement disposed between said screen and said aperture for transforming the light from the base pattern configuration into the predetermined illumination pattern.

2. The illumination device as set forth in claim 1, wherein the indexing interface further aligns said screen relative to said housing at least axially or radially for positioning the predetermined illumination pattern on the surface.

3. The illumination device as set forth in claim 1 wherein said indexing interface includes a plurality of circumferentially-spaced voids.

4. The illumination device as set forth in claim 3 wherein said objective lens arrangement includes a first lens having a plurality of studs and said condensing lens is fixed to said housing and defines a plurality of pockets, with said screen disposed between said objective lens arrangement and said condensing lens and with each of said plurality of studs individually disposed within said plurality of voids and said plurality of pockets to align and fix said screen relative to said housing.

5. The illumination device as set forth in claim 1 wherein said objective lens arrangement includes a first lens and a second lens with said first lens disposed between said light module and said second lens.

6. The illumination device as set forth in claim 5 wherein said second lens has a plurality of posts and said first lens has a plurality of holes with said plurality of posts individually disposed in said plurality of holes to index the first and second lenses relative to one another.

7. The illumination device as set forth in claim 5 wherein said first lens has first and second surfaces spaced from one another and said second lens has first and second surfaces spaced from one another with said first surface of said first lens facing said light module, said second surface of said second lens facing said aperture, and with said second surface of said first lens and said first surface of said second lens facing one another.

8. The illumination device as set forth in claim 7 wherein said second surface of said first lens abuts said first surface of said second lens.

9. The illumination device as set forth in claim 7 wherein each of said first and second surfaces of said first and second lenses are curved with each surface having a radius.

10. The illumination device as set forth in claim 8 wherein said first surface of said first lens has a substantially concave configuration and said second surface of said first lens has a substantially convex configuration.

11. The illumination device as set forth in claim 9 wherein said first surface of said second lens has a substantially concave configuration and said second surface of said second lens has a substantially convex configuration.

12. The illumination device as set forth in claim 9 wherein said radius of said second surface of said first lens is greater than said radius of said first surface of said first lens.

13. The illumination device as set forth in 12 wherein said radius of said second surface of said first lens is substantially equal to said radius of said first surface of said second lens.

14. The illumination device as set forth in claim 1 wherein said light module includes a semi-conductor light source.

15. The illumination device as set forth in claim 14 wherein said semi-conductor light source is further defined as a light emitting diode.

16. The illumination device as set forth in claim 14 wherein said semi-conductor light source is further defined as a laser light source.

17. The illumination device as set forth in claim 1 wherein said light module includes a printed circuit board supporting a light source and coupled to said housing.

18. The illumination device as set forth in claim 1 wherein said housing has a first section and a second section with said first section having said aperture.

19. An illumination system comprising:

a surface; and an illumination device comprising:

a housing having a cavity and an aperture that opens into said cavity;

a light module operatively attached to said housing and selectively emitting light into said cavity;

a screen at least partially disposed in said cavity between said light module and said aperture and having at least one opening defining a base pattern configuration corresponding to a predetermined illumination pattern on said surface, said screen aligning said light emitted from said light module through said opening into said base pattern configuration and subsequently projecting said light through said aperture onto said surface in said predetermined illumination pattern;

an indexing interface that circumferentially aligns said screen relative to said housing for positioning the predetermined illumination pattern on the surface;

a condensing lens disposed between said light module and said screen to collimate said light emitted from said light module toward said screen; and an objective lens arrangement disposed between said screen and said aperture to transform said light from said base pattern configuration into said predetermined illumination pattern.

20. The illumination system of claim 19, wherein the indexing interface further aligns said screen relative to said housing at least axially or radially for positioning the predetermined illumination pattern on the surface.

* * * * *